March 31, 1959    A. I. DRANETZ    2,880,333
ACCELEROMETER
Filed Nov. 17, 1954    2 Sheets-Sheet 1
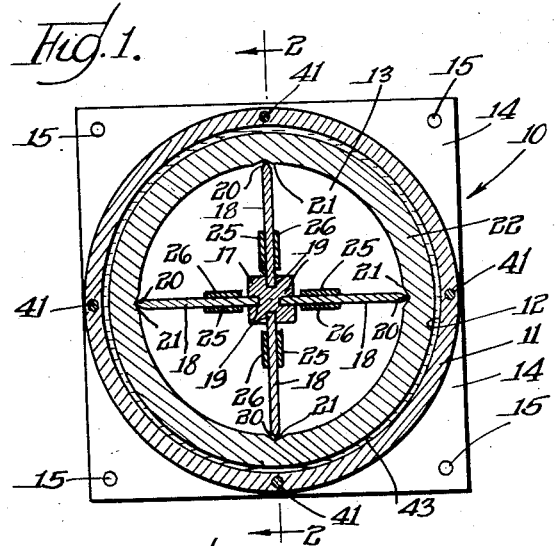
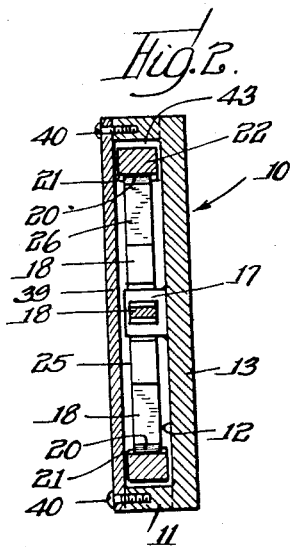
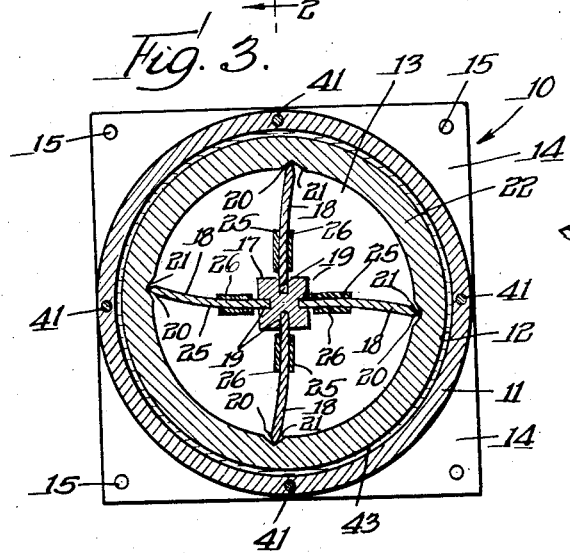
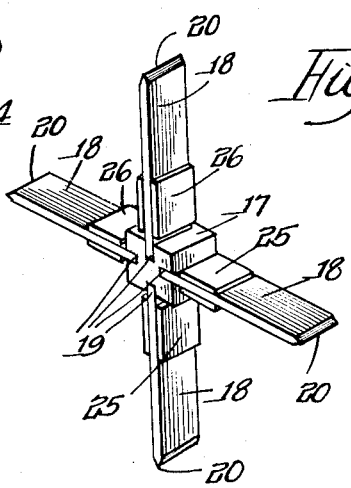
INVENTOR.
Abraham I. Dranetz
BY
Wallenstein & Spangenberg
Attys.

March 31, 1959　　　A. I. DRANETZ　　　2,880,333
ACCELEROMETER

Filed Nov. 17, 195.　　　　　　　　2 Sheets-Sheet 2

INVENTOR.
Abraham I. Dranetz
By Wallenstein & Spangenberg
Attys.

United States Patent Office 2,880,333
Patented Mar. 31, 1959

2,880,333

ACCELEROMETER

Abraham I. Dranetz, Metuchen, N.J., assignor to Gulton Industries, Inc., a corporation of New Jersey Application November 17, 1954, Serial No. 469,452

8 Claims. (Cl. 310—8.2)

The principal object of this invention is to provide an accelerometer for measuring angular acceleration of a body, wherein angular acceleration of the body is accurately measured, wherein linear acceleration of the body has substantially no effect upon the measurement of angular acceleration, wherein the energy of velocity of the body has substantially no effect upon the measurement of angular acceleration, wherein the action of the accelerometer may be readily damped, and wherein the accelerometer is simple in construction and fool proof in operation, is inexpensive to manufacture and may be readily installed for use.

Further objects of this invention reside in the details of construction of the accelerometer and in the cooperative relationships between the component parts thereof.

Other objects and advantages of this invention will become apparent to those skilled in the art upon reference to the accompanying specification, claims and drawings, in which:

Fig. 1 is an elevational view of the accelerometer of this invention with the cover removed;

Fig. 2 is a vertical sectional view through the accelerometer taken substantially along the line 2—2 of Fig. 1;

Fig. 3 is a view similar to Fig. 1 but showing the relative location of the parts under conditions of acceleration;

Fig. 4 is a perspective view of a portion of the mechanism ilustrated in Figs. 1 to 3;

Figure 5:
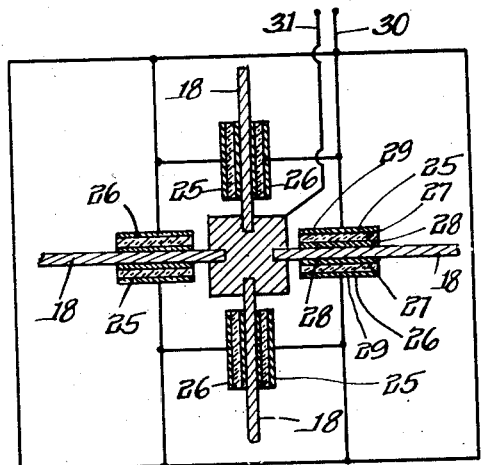
Fig. 5 is a schematic diagram illustrating one form of the wiring utilized in this invention.

The accelerometer of this invention for measuring angular acceleration of a body is generally designated at 10 in the drawings. It includes a housing 11 which has a cylindrical cavity 12 therein. The housing is provided with a wall 13 and extensions of this wall form flanges 14 by means of which the accelerometer may be secured to a body whose angular acceleration is to be measured. Toward this end, the flanges 14 may be provided with holes 15 therethrough for receiving screws by which the accelerometer may be fastened to the body. Located within the housing 11 is a central hub 17 extending from the wall 13, the cavity 12 being concentric with this hub 17.

A plurality of cantilevers 18 are secured at their ends to the hub 17 and these cantilevers 18 extend radially outwardly therefrom. The cantilevers 18 may be secured in suitable notches or slots 19 in the hub 17. Preferably the cantilevers 18 are arranged in pairs and the cantilevers of each pair are angularly spaced apart by 180 degrees. Any number of pairs of cantilevers may be utilized, two pairs of such cantilevers being illustrated here. The cantilevers 18, the hub 17 and the housing 11 may be formed of any suitable metal. The outer ends of the cantilevers 18 are provided with knife edges 20 and these knife edges are received in V-slots 21 in a mass ring 22. In this way, the cantilevers 18 carry the mass ring 22 within the cavity 12 of the housing 11 concentrically to the hub 17. The knife edges 20 and the V-slots 21 form pivotal connections between the outer ends of the cantilevers 18 and the mass ring 22. On the other hand, the inner ends of the cantilevers 18 are rigidly secured to the hub 17. While the mass ring 22 has been shown in the form of a true ring, the inner surfaces thereof may be extended inwardly toward the cantilevers 18 for partially filling the space therebetween and adding greatly to the mass of the ring. The term mass ring as utilized herein, covers all such arrangements.

When angular acceleration is applied by the body to the housing 11 and the hub 17 they move angularly about the axis of the hub 17 with respect to the mass ring 22 which, by reason of its inertia, tends to remain stationary. As shown in Fig. 3, the housing 11 and hub 17 are accelerating in a counterclockwise direction with respect to the mass ring 22 and as this occurs, the cantilevers 18 are forced to bend in the manner illustrated. If the acceleration were in the opposite direction, the cantilevers 18 would bend in the other direction. In all instances, however, the cantilevers 18 are stressed only into a single bend by this angular acceleration, this being afforded by the fact that the inner ends of the cantilevers 18 are rigidly secured to the hub 17 while the outer ends thereof are pivotally secured to the mass ring 22. If the outer ends of the cantilevers 18 were rigidly secured to the mass ring 22 then that rigid connection would react in the cantilevers to cause a double bend therein. For the purposes of this invention, the placing of single bends in the cantilevers 18 is preferable and that is the reason for pivotally connecting the mass ring 22 to the outer ends of the cantilevers 18. If a linear acceleration is applied to the housing 11 and the hub 17 and the cantilevers 18 should bend in response to such linear acceleration the opposed cantilevers of each pair would bend in opposite directions and as pointed out hereafter this opposite bending of the cantilevers of the opposed pairs operates to cancel out the effects of such linear acceleration.

Stress responsive electrical elements 25, 26 are secured to the cantilevers 18 and these elements are stressed in accordance with the bending of the cantilevers. These electrical elements 25 and 26 are electrically connected to a suitable measuring instrument for producing an electrical voltage which corresponds to the angular acceleration imparted to the housing 11 and hub 17. The stress responsive electrical elements 25, 26 may be of any desired type but particularly satisfactory results are obtained by using piezoelectric elements. The piezoelectric elements are shown in more detail in Figs. 5, 6 and 7 and while they may be of any suitable construction they are preferably formed from a piezoelectric ceramic material, here, each piezoelectric member 25, 26 is formed from a thin sheet of piezoelectric ceramic 27 such as barium titanate ceramic. Each titanate ceramic sheet 27 is provided with a pair of electrodes 28 and 29 secured to the opposite faces thereof. The electrodes 28 and 29 may be formed on the titanate ceramic members 27 by applying silver paste to the opposite faces thereof and then firing the paste to form a good bond between the electrodes and the barium titanate elements. The electrodes 28 of the titanate ceramic elements 27 are secured to the two opposite faces of the cantilevers 18 in any suitable manner, such as by soldering the same thereto. Thus, the electrodes 28 in addition to being bonded to the cantilevers 18 are also electrically conductively coupled thereto. The titanate ceramic elements 27 are preferably permanently polarized to make the same piezoelectric.

In the form of the invention illustrated in Fig. 5, the piezoelectric elements 25, 26 are symmetrically secured to opposite sides of each cantilever 18 with the electrodes 28 bonded to and electrically coupled to the cantilevers 18. The outer electrodes 29 of the elements 25 and 26 are all conductively coupled together by a conductor 30 and the inner electrodes 28 are all conductively coupled together by the cantilevers 18, hub 17 and conductor 31. The conductors 30 and 31 lead to a suitable measuring instrument such as a millivoltmeter or the like for measuring the voltage produced by the elements 25 and 26 resulting from the bending of the cantilevers 18 when the housing 11 and hub 17 are accelerated with respect to the mass ring 22. In polarizing the titanate ceramic elements of the arrangement of Fig. 5 the outer electrodes 29 thereof are not connected together. Instead the outer electrodes 29 of the elements 26 are connected to one terminal of a D.C. voltage source and the outer electrodes 29 of the other elements 25 are connected to the other terminal of the D.C. voltage source. A sufficiently high D.C. voltage is applied for a sufficiently long time to the elements 25 and 26, located in series, so as permanently to polarize these elements in the same direction. After polarization these connections are removed and then the elements are connected in parallel as indicated in Fig. 5. This arrangement provides relatively high capacitance which under certain circumstances is desirable for matching purposes. When angular acceleration of the housing 11 and hub 17 occurs, the cantilevers 18 correspondingly bend which in turn correspondingly stress the elements 25 and 26 for producing a voltage in a direction and in an amount corresponding to the direction and amount of angular acceleration. This voltage is measured by the meter for indicating the direction and extent of acceleration. If a linear acceleration should occur so as to linearly move the housing 11 and hub 17 with respect to the mass ring 22, then the opposed cantilevers 18 of the pairs of cantilevers will bend in opposite directions to produce opposite voltages in their respective elements 25 and 26. These opposite voltages counteract each other to cancel out the effect of the linear acceleration. Thus, the accelerometer is responsive substantially only to angular acceleration. Further, since the housing 11 and hub 17 rotate with respect to the mass ring 22 only upon angular acceleration, which is substantially independent of angular speed, energy of velocity of the body has substantially no effect upon the measurement of the angular acceleration. In other words, if the housing 11 is stationary there is no change in position between the housing and the mass ring and likewise, if the housing is rotating at a constant speed the positon of the mass ring 22 with respect to the housing remains fixed with the cantilevers 18 substantially unstressed.

Figure 6:
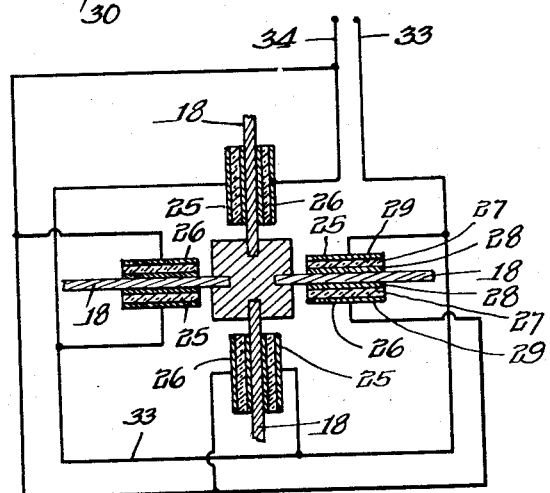
Fig. 6 is an illustration similar to Fig. 5 but illustrating another form of the wiring.

The arrangement illustrated in Fig. 6 is like that illustrated in Fig. 5 with the exception that the electrical connections to the elements 25 and 26 and the manner of polarizing the elements 25 and 26 is different. Here, the outer electrodes 29 of the elements 25 are electrically connected together by a conductor 33 and the outer electrodes 29 of the elements 26 are electrically connected together by a conductor 34. Here, the conductors 33 and 34 extend to a suitable measuring instrument. In polarizing the elements 25 and 26 the outer electrodes 29 of both of the elements 25 and 26 are electrically connected to one source of a D.C. voltage and the inner electrodes 28 of the elements 25 and 26 are connected together and to the other terminal of the D.C. voltage source through the cantilevers 18. This high D.C. voltage is applied for a sufficiently long period of time to permanently polarize the titanate ceramic members 27, the elements being polarized in opposite directions because of the parallel connection. When the polarizing is completed these electrical connections are broken and the electrical connections illustrated in Fig. 6 are established. The elements 25 and 26 which have been reversely polarized are connected in series in Fig. 6 and, accordingly, high voltage sensitivity is brought about with a decrease in capacitance. Either type of arrangement as illustrated in Figs. 5 and 6 may be utilized depending upon the degree of voltage sensitivity and capacity desired. Outside of these differences, the two arrangements operate in the same way and a further description is not considered necessary.

Figure 7:
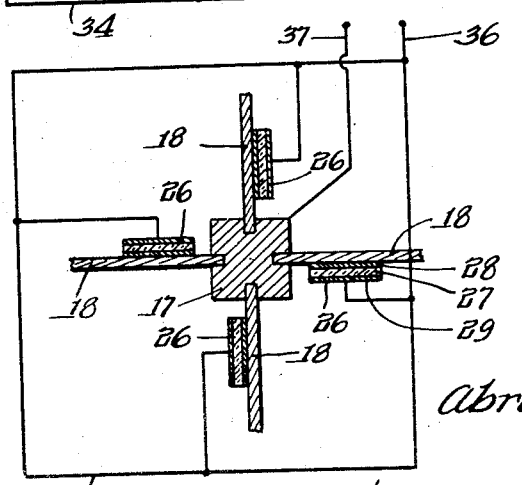
Fig. 7 is a diagrammatic illustration similar to Figs. 5 and 6 but showing still another form of the wiring.

In the arrangement of Fig. 7, only a single element is secured to each cantilever 18. Here, the single element is designated at 26 and corresponds in all respects to the elements 26 discussed above in connection with Figs. 5 and 6. Here, the inner terminals or electrodes 28 of the elements 26 are secured to the cantilevers 18 and are conductively coupled thereto. The outer electrodes 29 are all connected together by a conductor 36. The inner electrodes 28 are conductively coupled together through the cantilevers 18 and the hub 17 to the conductor 37. The conductors 36 and 37 extend to a suitable measuring instrument for measuring the voltage produced by the elements 26 upon the occurrence of acceleration. These single elements may be permanently polarized by connecting the conductors 36 and 37 to a sufficiently high D.C. voltage for a sufficiently long period of time. The arrangement of Fig. 7 operates in substantially the same manner as described above and a further description is not considered necessary. Instead of utilizing piezoelectric ceramic elements as described above, resistance type strain gages may be secured to the cantilevers 18 so as to be strained in accordance with the bending of the cantilevers and these strain gages may, if desired, be internally connected in the form of a bridge. Also, other types of stress responsive electrical elements may be used if so desired.

The cavity 12 in the housing 11 may be sealed closed by means of a closure plate 39 held in place on the housing 11 by means of screws 40 extending through the closure plate 39 into taped holes 41 in the housing 11. Thus, the parts of the accelerometer of this invention may be sealed closed. To provide mechanical damping in the accelerometer and to absorb energy of velocity, if such should exist, damping means 43 are associated with the housing and mass ring for damping the relative angular movement therebetween. One form of damping may be accomplished by interposing a viscous fluid, such as silicone oil, between the housing 11 and the mass ring 22. Alternatively, a circular rubber sleeve may be inserted between the housing 11 and mass ring 22 so that the energy of velocity between the housing 11 and the mass ring 22 is mechanically absorbed to thus provide damping. Another arrangement which may be utilized to bring about both maximum mass loading and damping is to fill the entire housing cavity 12 with a viscous fluid or to mold the entire internal assembly in rubber or neoprene or other flexible resilient material.

The accelerometer of this invention operates below the resonant frequency of the seismic mass 22 and spring or cantilever 18 combination. The cantilever deformation or bending is proportional to the angular acceleration and thus accurate readings of angular acceleration are readily obtained. The accelerometer of this invention offers a method whereby it is possible to increase sensitivity and resonant frequency while decreasing the overall weight and size.

While for purposes of illustration several forms of this invention have ben disclosed, other forms thereof may become apparent to those skilled in the art upon reference to this disclosure and, therefore, this invention is to be limited only by the scope of the appended claims.

I claim as my invention:

1. An accelerometer for measuring angular acceleration of a body comprising, a central hub, means for securing the central hub to the body whose angular acceleration is to be measured, a plurality of cantilevers secured to the central hub and extending radially outwardly therefrom, a mass ring carried by the ends of the cantilevers concentrically with the hub, said hub rotating with respect to said mass ring and said cantilevers bending in accordance with the angular acceleration applied to the hub by the body, and means, including stress responsive electrical elements secured to the cantilevers and stressed as the cantilevers bend, for producing an electrical voltage corresponding to the angular acceleration imparted to the central hub.

2. An accelerometer for measuring angular acceleration of a body comprising, a central hub, means for securing the central hub to the body whose angular acceleration is to be measured, a plurality of cantilevers secured to the central hub and extending radially outwardly therefrom, a mass ring carried by the ends of the cantilevers concentrically with the hub, said hub rotating with respect to said mass ring and said cantilevers bending in accordance with the angular acceleration applied to the hub by the body, and means, including a piezoelectric element secured to each side of each cantilever and stressed as the cantilevers bend, for producing an electrical voltage corresponding to the angular acceleration imparted to the central hub.

3. An accelerometer for measuring angular acceleration of a body comprising, a central hub, means for securing the central hub to the body whose angular acceleration is to be measured, at least one pair of cantilevers secured to the central hub and extending radially outwardly therefrom and angularly spaced 180 degrees apart, a mass ring carried by the ends of the cantilevers concentrically with the hub, said hub rotating with respect to said mass ring and the cantilevers bending in the same angular direction in accordance with angular acceleration applied to the hub by the body and the cantilevers bending in opposite angular directions in accordance with linear acceleration applied to the hub by the body, and means, including stress responsive electrical elements correspondingly secured to the cantilevers and stressed as the cantilevers bend, for producing an electrical voltage substantially corresponding to the angular acceleration imparted to the central hub but not the linear acceleration.

4. An accelerometer for measuring angular acceleration of a body comprising, a central hub, means for securing the central hub to the body whose angular acceleration is to be measured, a plurality of cantilevers secured to the central hub and extending radially outwardly therefrom, a mass ring, means including pivotal connections for mounting the mass ring on the ends of the cantilevers concentrically with the hub, said hub rotating with respect to said mass ring and said cantilevers bending in one direction only or the other and in an amount in accordance with the direction and amount of angular acceleration applied to the hub by the body, and means, including stress responsive electrical elements secured to the cantilevers and stressed as the cantilevers bend, for producing an electrical voltage corresponding to the angular acceleration imparted to the central hub.

5. An accelerometer for measuring angular acceleration of a body comprising a hollow housing having a central internal hub therein, means for securing the housing and hence the hub to the body whose angular acceleration is to be measured, a plurality of cantilevers secured to the central hub within the housing and extending radially outwardly from the hub, a mass ring in the housing carried by the ends of the cantilevers concentrically with the hub, said housing and hub rotating with respect to said mass ring and said cantilevers bending in accordance with the angular acceleration applied to the housing and hub by the body, and means, including stress responsive electrical elements secured to the cantilevers and stressed as the cantilevers bend, for producing an electrical voltage corresponding to the angular acceleration imparted to the housing and central hub.

6. An accelerometer for measuring angular acceleration of a body comprising a hollow housing having a central internal hub therein, means for securing the housing and hence the hub to the body whose angular acceleration is to be measured, a plurality of cantilevers secured to the central hub within the housing and extending radially outwardly from the hub, a mass ring in the housing carried by the ends of the cantilevers concentrically with the hub, said housing and hub rotating with respect to said mass ring and said cantilevers bending in accordance with the angular acceleration applied to the housing and hub by the body, and means, including stress responsive electrical elements secured to the cantilevers and stressed as the cantilevers bends, for producing an electrical voltage corresponding to the angular acceleration imparted to the housing and central hub, and damping means associated with the housing and mass ring for damping the relative angular movement of the mass ring with respect to the housing and for absorbing energy of velocity therebetween.

7. An accelerometer for measuring angular acceleration of a body comprising, a central hub, means for securing the central hub to the body whose angular acceleration is to be measured, at least one pair of cantilevers secured to the central hub and extending radially outwardly therefrom and angularly spaced 180 degrees apart, a mass ring, means including pivotal connections for mounting the mass ring on the ends of the cantilevers concentrically with the hub, said hub rotating with respect to said mass ring and said cantilevers bending in one direction only and in the same angular direction in accordance with the angular acceleration applied to the hub by the body and the cantilevers bending in opposite angular directions in accordance with linear acceleration applied to the hub by the body, and means, including stress responsive electrical elements correspondingly secured to the cantilevers and stressed as the cantilevers bend, for producing an electrical voltage substantially corresponding to the angular acceleration imparted to the central hub but not the linear acceleration.

8. An accelerometer for measuring angular acceleration of a body comprising a hollow housing having a central internal hub therein, means for securing the housing and hence the hub to the body whose angular acceleration is to be measured, a plurality of cantilevers secured to the central hub within the housing and extending radially outwardly from the hub, a mass ring in the housing, means including pivotal connections for mounting the mass ring on the ends of the cantilevers concentrically with the hub, said housing and hub rotating with respect to said mass ring and said cantilevers bending in one direction only or the other and in an amount in accordance with the direction and amount of angular acceleration applied to the housing and hub by the body and means, including stress responsive electrical elements secured to the cantilevers and stressed as the cantilevers bend, for producing an electrical voltage corresponding to the angular acceleration imparted to the housing and central hub.

References Cited in the file of this patent

UNITED STATES PATENTS

| | | |
|---|---|---|
| 1,599,922 | Rathbone | Sept. 14, 1926 |
| 2,488,586 | Diemer | Nov. 22, 1949 |